M. MILLER.
Lantern.
No. 1,374. Reissued Jan. 6, 1863.
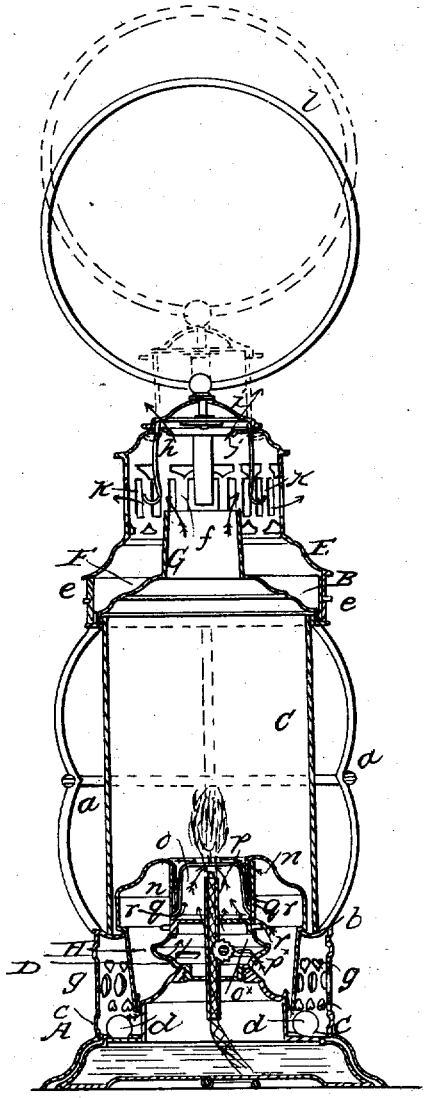
N. PETERS, Photo-Lithographer, Washington, D. C.

UNITED STATES PATENT OFFICE.

WILLIAM H. RACEY, OF NEW YORK, N. Y., ASSIGNEE, BY MESNE ASSIGNMENTS, OF MAX. MILLER.

IMPROVEMENT IN LANTERNS FOR COAL-OIL.

Specification forming part of Letters Patent No. 21,209, dated August 17, 1858; Reissue No. 1,374, dated January 6, 1863.

*To all whom it may concern:*

Be it known that I, WILLIAM H. RACEY, of the city, county, and State of New York, by virtue of certain assignments from MAX. MILLER and JOHN JOSEPH GWYNN, vesting in me the exclusive right and title of Letters Patent for Improved Lantern for Burning Coal-Oil, granted to MAX. MILLER, and bearing date August 17, 1858, do, for the purpose of obtaining a reissue of said Letters Patent, hereby declare that the following is a full, clear, and exact description of the invention therein contained, reference being had to the accompanying drawing, making a part of this specification, said drawing being a vertical central section of the invention.

To enable those skilled in the art to fully understand and construct my invention, I will proceed to describe it.

A represents the base of a lantern, which externally may be of the usual form, and B is a metal ring or band which is attached to the base A by rods or guards *a*. C is a glass cylinder (or protector) which is fitted within the ring or band B and guards *a*, the lower end of the cylinder C resting in a recess, *b*, in the top of the base A, as plainly shown in the drawing. Within the base A, and near its lower part, an annular horizontal projecting plate, *c*, is attached, said plate being slotted to receive knobs *d*, which, when fitted in the slots of the plate *c* and properly turned or adjusted, secure the lamp D within the base A. The lamp D may be constructed in any of the forms now used for burning coal-oil, (and similar hydrocarbons.) On the ring or band B a cap, E, is fitted and secured by pins *e* on the ring or band, which fit in slots made in the cap. The cap E is perforated at its side, as shown at *f*, and the base A is also perforated at its side, as shown at *g*. In the top of the cap E there is an aperture, *h*, over which a plate, *i*, is placed and secured in proper position by springs or elastic bars *j*, which pass through the top of the cap and press sufficiently hard against the edges of the apertures through which they pass as to retain the plate when pressed in and closed over the aperture *h*. The inner ends of the bars *j* are bent, as shown at *k*, so that the bars cannot be withdrawn from the cap. To the plate *i* a handle or ring, *l*, is attached. Within the ring or band B, and directly over the top of the cylinder C, a plate, F, is placed, said plate having a short tube, G, at its center, which extends upward a short distance within the cap E. Within the base A an inverted cap, H, is placed, the lower end of said cap extending down to within a short distance of the plate *c*. The upper end of the cap has a band, *m*, fitted in it at its center, said band projecting downward a short distance, and being perforated, as shown at *n*. The band *m* projects downward between the cylindrical portion *o* of the cap, which encompasses the wick-tube *p*, and the outer flange, *q*, being perforated, as usual, both above and below the junction of the cylindrical portion *o*, as shown at *r*. The cap $o^{\times}$, which screws into the top of the body of the lamp D, is also perforated at its lower part, as shown at $p^{\times}$, and apertures $q^{\times}$ are made in the top of cap $o^{\times}$ at each side of the wick-tube *p*.

From the above description it will be seen that the frame is supplied with air by a current or draft of air which passes through the perforations *g* of the base A and upward through the cap H through the perforations *r* of the flange *q* of the cap that covers the wick-tube, and passes up both within and at the outer side of wick-tube cap *o*. The air also passes upward through the cap $o^{\times}$, escaping through the openings $q^{\times}$. The cylinder C being filled with heated air, the flame is supplied with a steady current or stream, in consequence of the arrangement of the cap H and perforated band *m*, encompassing the upper part of the lamp D, said arrangement preventing the ill effects of sudden gusts of wind by retarding or disturbing or dividing the same in its passage upward, so that it will be equally presented to the flame all around. The tube G at the upper end of the cylinder C prevents the air from passing too rapidly through the cylinder C, so that the flame will receive the benefit of all the oxygen that enters the cylinder C. The cap H forms a partition within the cylinder or protector C which directs all the air that enters the lamp toward the flame, and thereby improves the combustion and intensity of the light.

Having thus described the invention, what I claim as new, and desire to secure by Letters Patent, is—

1. The combination, with the cylinder or protector C, of the inverted cup H or its equivalent device, substantially as and for the purpose herein shown and described.

2. The combination, with the protector or cylinder C, of the tube G, substantially in the manner and for the purpose herein shown and described.

WILLIAM H. RACEY.

Witnesses:
JAMES LAIRD,
J. W. COOMBS.